US007804057B2

(12) United States Patent
Sato et al.

(10) Patent No.: US 7,804,057 B2
(45) Date of Patent: Sep. 28, 2010

(54) OPTICAL SUBSTANCE MANIPULATOR

(75) Inventors: Yohei Sato, Yokohama (JP); Koichiro Saiki, Yokohama (JP)

(73) Assignee: Keio University, Tokyo (JP)

( * ) Notice: Subject to any disclaimer, the term of this patent is extended or adjusted under 35 U.S.C. 154(b) by 257 days.

(21) Appl. No.: 11/802,464

(22) Filed: May 23, 2007

(65) Prior Publication Data

US 2007/0284515 A1 Dec. 13, 2007

(30) Foreign Application Priority Data

May 23, 2006 (JP) ............................ 2006-142315

(51) Int. Cl.
*H01S 3/101* (2006.01)
*G21K 5/04* (2006.01)

(52) U.S. Cl. ...................................................... 250/251

(58) Field of Classification Search ................. 250/251; 331/3; 372/23, 27, 29.02, 9, 20, 29.01, 29.011; 204/157.22, 192.11, 157.15; 359/385, 388, 359/362, 373

See application file for complete search history.

(56) References Cited

U.S. PATENT DOCUMENTS 6,055,106 A * 4/2000 Grier et al. .................. 359/566
2004/0051034 A1* 3/2004 Grier et al. .................. 250/251
2004/0089798 A1* 5/2004 Gruber et al. ............... 250/251
2006/0060767 A1* 3/2006 Wang et al. ................. 250/251
2007/0069119 A1* 3/2007 Appleyard et al. .......... 250/251
2007/0139784 A1* 6/2007 Roichman et al. ........... 359/614
2008/0231939 A1* 9/2008 Gluckstad ................... 359/298
2009/0032449 A1* 2/2009 Mueth et al. .................. 210/94

FOREIGN PATENT DOCUMENTS

JP 2005-502482 1/2005
JP 2005-515878 6/2005

OTHER PUBLICATIONS

Dasgupta et al., "Controlled Rotation of Biological Microscopic Objects Using Optical Line Tweezers", 2003, Biotechnology Letters vol. 25, pp. 1625-1628.*

(Continued)

*Primary Examiner*—Jack I Berman
*Assistant Examiner*—Nicole Ippolito Rausch
(74) *Attorney, Agent, or Firm*—Kratz, Quintos & Hanson, LLP

(57) ABSTRACT

The invention relates to an optical substance manipulator capable of continuing to apply a continued force of action to moving substances without being limited by the flowing conditions for the substances yet with a wide manipulation margin and with efficiency, thereby continuously carrying out various manipulations such as separation, concentration, mixing, and deflection. Specifically, the invention provides an optical substance manipulator capable of manipulating microscopic particles dispersed in a flowing fluid by means of light pressure, characterized by comprising an optical system that forms multiple linear light-collective areas simultaneously with respect to a fluid that flows on a subject surface (5), and further comprising, in optical paths forming the respective linear light-collective areas, means (CL1), (CL2) adapted to adjust directions of the linear light-collective areas on the subject surface and means (M1), (M2) adapted to adjust positions of the linear light-collective areas.

3 Claims, 3 Drawing Sheets

OTHER PUBLICATIONS

A.Ashkin: "History of Optical Trapping and Manipulation of Small Neutral Particle, Atoms, and Molecules"; *IEEE Journal on Selected Topics in Quantum Electronics,* vol. 6, No. 6; Nov./Dec. 2000 (pp. 841-856).

Yasuharu Arai et al.: "Tying a molecular not with optical tweezers"; *Letters to Nature-Macmillan Magazines Ltd.,* vol. 399, Jun. 3, 1999 (pp. 446-448).

David G. Grier: "A revolution in optical manipulation"; *insight review articles, Nature Publishing Group,* vol. 424, Aug. 14, 2003 (pp. 810-816).

Raktim Dasgupta et al.: "Controlled rotation of biological microscopic objects using optical line tweezers"; *Biotechnology Letters,* vol. 25, *Kluwer Academic Publishers,* 2003 (pp. 1625-1628).

Pamela T. Korda et al.: "Kinetically Locked-In Colloidal Transport in an Array of Optical Tweezers"; *Physical Review Letters,* vol. 89, No. 12, *The American Physical Society,* Sep. 16, 2002 (4 pages).

M. P. MacDonald et al.: "Microfluidic sorting in an optical lattice"; Letters to Nature, Nature Publishing Group, vol. 426, Nov. 27, 2003 (pp. 421-424).

Hiroo Ukita: "Micromechanical Photonics-Applications of Optical Information Systems", Morikita Shuppan Co., Ltd., 2002 (5 pages).

* cited by examiner

OPTICAL SUBSTANCE MANIPULATOR

This application claims benefit of Japanese Application No. 2006-142315 filed in Japan on May 23, 2006, the contents of which are incorporated by this reference.

BACKGROUND OF THE INVENTION

The present invention relates generally to an optical substance manipulator, and more particularly to an optical substance manipulator harnessing the principles of optical tweezers, which are applied to some fields such as biochemical, molecular mechanics and micro•nanoscale thermofluid engineering fields.

Optical substance manipulation techniques represented by an optical tweezers device are capable of manipulating a microscale substance in a non-contact, non-destructive fashion. There is an optical tweezers technique extensively put into practical use, in which light is tightly focused by an objective lens or the like into a medium such as a solution or air, so that a substance (particles) can be picked up near the focus of incident light by virtue of light pressure occurring at the substance interface in the medium (see Non-Patent Publication 1).

The optical tweezers technique is capable of picking up a substance in a non-contact way, and manipulating the captured subject three-dimensionally with a micrometric order resolving power. For this reason, there has been much achieved through its use as an experimental tool that applies any desired manipulation to a subject of sub-microscopic size such as a single cell or DNA to go deep into what happens chemically and biologically (Non-Patent Publication 2). As one example, there is the result so far reported of using optical tweezers to take hold of and manipulate microscopic particles added to both terminus of a string form of a single molecule, thereby making a knot across the molecular and measuring a tension change (Non-Patent Publication 3).

The optical substance manipulation techniques used so far in the art, for the most part, make use of laser light obtained by entering parallel light in a collective lens such as an objective lens to focus that light onto one point. With this method, strong manipulation force is obtainable because the light is focused with high intensity; however, there is the scope of action narrowing down to a few micrometers for that. Further, the directionality of manipulation force resulting from light pressure is only limited to that of trapping force toward, or repulsive force off, the laser focus. For this reason, a substance of micrometer order is manipulated by a method wherein once that substance has been trapped at the focus, the whole ambient medium or the whole laser irradiation system is moved to transfer the substance. This method works very favorably for moving a single substance to any desired position; however, it renders it difficult to apply extensive manipulation, continuous manipulation, and fast manipulation to a group of massive substances scattered in the medium.

In recent years, an idea for making up for the narrowness of the range of action of the optical tweezers technique has been proposed: there are a number of laser irradiation areas formed in a medium as by locating a special diffraction grating or the like in a laser light path to split a laser beam into multiple beams, so that multiple substances can be manipulated simultaneously (Non-Patent Publication 4, and Patent Publications 1 and 2). Also, it has been reported that by locating a cylindrical lens or the like in an optical path, the laser focus is so transformed that multiple substances can be trapped linearly (Non-Patent Publication 5). With these methods, it is true that the amount of concurrently manipulatable substances can be increased; however, they are similar to the prior art in terms of light pressure being used as a substance trapping force, and so are used mainly for substance manipulation after trapping.

To enable continuous manipulation without taking hold of a substance, it is necessary to continue to apply continued force of action to a moving substance. For instance, if a subject group of substances is in a constantly flowing state, continuous manipulation is enabled even with trapping force as light pressure. In this regard, there is a continuous manipulation method proposed, using multi-point optical tweezers using a diffraction grating (Non-Patent Publications 6 and 7, and Patent Publication 1). However, the performance of action would vary largely depending on the flowing conditions for substances. In addition, this method is inefficient because the margin of substance manipulation is narrow relative to the range of substantial light irradiation.

Patent Publication 1
JP2005-502482A
Patent Publication 2
JP2005-515878A
Non-Patent Publication 1
Hiroo Ukita, "Micromechanical Photonics—Applications of Optical Information Systems", pp. 61 (published by Morikita Shuppan Co., Ltd., 2002, 9)
Non-Patent Publication 2
Ashkin, A., IEEE Journal of Selected Topics in Quantum Electronics, Vol. 6, pp. 841-856, (2000)
Non-Patent Publication 3
Arai, Y., et al., Nature, Vol. 399, pp. 446-448, (1999)
Non-Patent Publication 4
Grier, D. G., Nature, Vol. 424, pp. 810-816, (2003)
Non-Patent Publication 5
Dasgupta, R., et al., Biotechnology Letters, 25, Pp. 1625-1628, (2003)
Non-Patent Publication 6
Korda, P. T., et al., Physical Review Letters, Vol. 89, No. 12, 128301, (2002)
Non-Patent Publication 7
MacDonald, M. P., et al., Nature, Vol. 426, pp. 421-424, (2003)

SUMMARY OF THE INVENTION

The prior art situations being like this, the present invention has for its object the provision of an optical substance manipulator capable of continuing to apply a continued force of action to moving substances without being limited by the flowing conditions for the substances yet with a wide manipulation margin and with efficiency, thereby continuously carrying out various manipulations such as separation, concentration, mixing, and deflection.

According to the invention, that object is achieved by the provision of an optical substance manipulator capable of manipulating microscopic particles dispersed in a flowing fluid by means of light pressure, characterized by comprising an optical system that forms multiple linear light-collective areas simultaneously with respect to a fluid that flows on a subject surface, and further comprising, in optical path forming the respective linear light-collective areas, means adapted to adjust the directions of the linear light-collective areas on the subject surface and means adapted to adjust the positions of the linear light-collective areas.

Preferably in this case, that means adapted to adjust the directions of the linear light-collective areas is a cylindrical lens or mirror adjustable in terms of rotation.

Similarly, it is preferred that the means adapted to adjust the positions of the linear light-collective areas comprises an optical element adjustable in terms of position and angle.

It is also preferred that the aforesaid optical system works splitting light coming out of one light source into two or more and synthesizing light after passing through the means adapted to adjust the directions of the linear light-collective areas and the means adapted to adjust the positions of the linear light-collective areas.

It is further preferred that there are two linear light-collective areas formed, and the aforesaid optical system comprises a light splitter means adapted to split light coming out of one light source into two, means adapted to adjust the directions of the linear light-collective areas, means adapted to adjust the positions of the linear light-collective areas, and light synthesis means adapted to synthesize the light split into two.

The optical substance manipulator of the invention provides a non-contact type substance manipulation system that harnesses laser radiation pressure with an improved degree of flexibility in the ability to manipulate subjects. As compared with the prior optical tweezers art, the invention makes it easier to implement a bulk of manipulations for a group of substances scattered over an extensive range: it is possible to manipulate cells and DNAs in large quantities and in continuous fashions. The invention, because of manipulating substances without fixing them to one site, also allows for continued manipulations of substances flowing in a microscopic flowing topology represented by microchemical chips. With the invention harnessing non-destructive laser light, it is further possible to manipulate biological substances while keeping them intact. Furthermore, the invention allows for localized manipulation limited to the laser irradiation range, making a lot of contributions to the development of technology toward the integration of functions on chips for DNA analysis and chemical synthesis. In addition, the optical substance manipulator of the invention can be additionally attached to an optical microscope, and so has high general versatility with sample vessels. Thus, the inventive optical substance manipulator can implement various substance manipulations on the same system without recourse to any exclusive diffraction gratings, etc., and so would have a lot more applications in a lot more fields, and ever higher versatilities as well.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
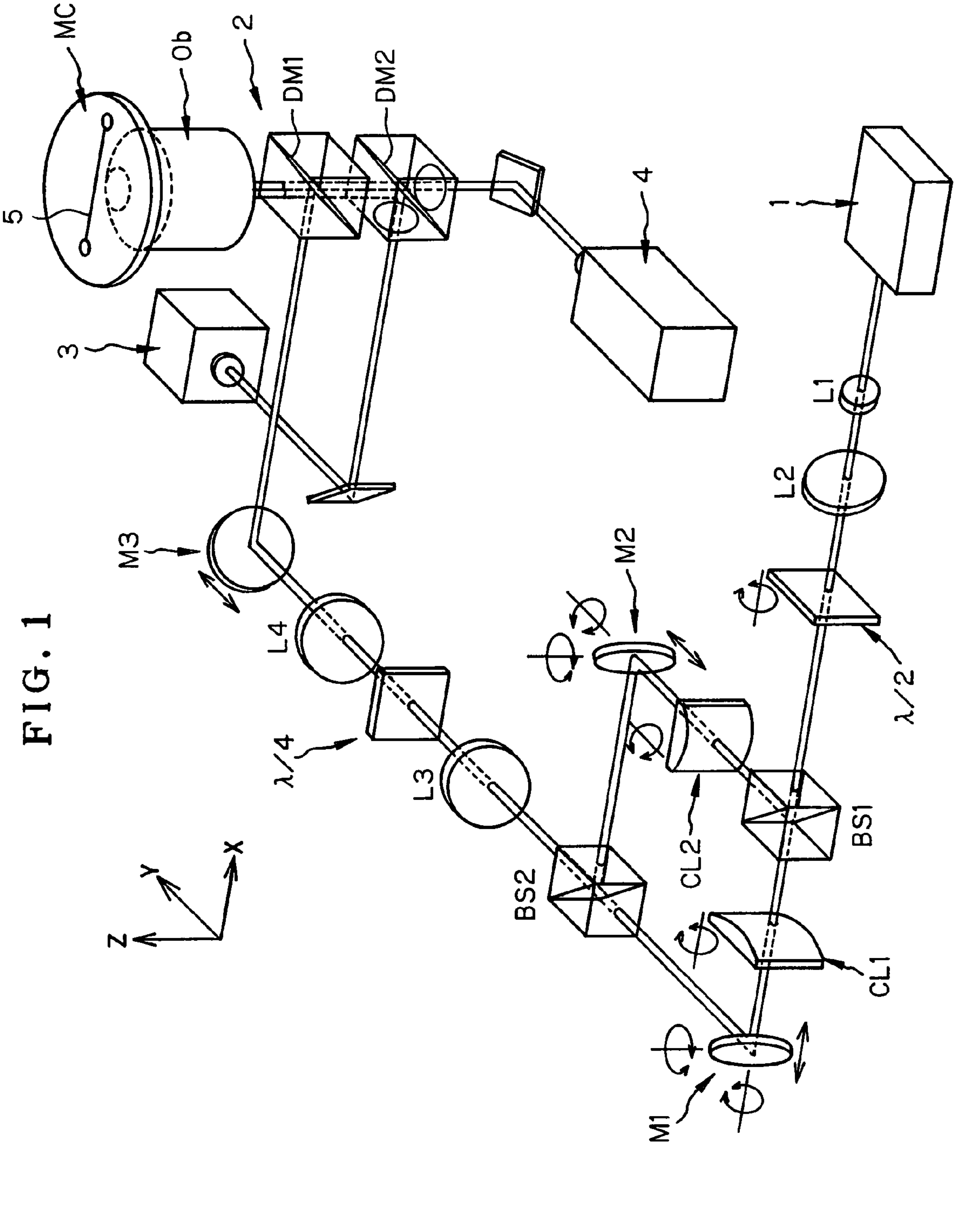
FIG. 1 is illustrative in schematic of the construction of one embodiment of the optical substance manipulator according to the invention.

The optical substance manipulator of the invention is, now explained with references to one preferred embodiment. FIG. 1 is illustrative in schematic (perspective) of the construction of one embodiment of the optical substance manipulator. For a better understanding of explanation, coordinate axes X, Y and Z are determined as shown. Linearly polarized laser light oscillated from a light source laser 1 (e.g., a near infrared Nd:YAG laser of 1,064 nm in wavelength) is expanded in beam diameter at a beam expander made up of a negative lens L1 and a positive lens L2 confocal with each other, incident on a half-wave plate $\lambda/2$ at which its direction of polarization is rotated in a given direction. Then, the light enters the first polarization beam splitter BS1 at which it is split into two components: a component polarized in the Z direction (hereinafter called p-polarized light) and a component polarized in the XY direction (similarly s-polarized light). The p-polarized light component travels toward a mirror M1 through the first polarizing beam splitter BS1 while the s-polarized light propagates to ward a mirror M2 upon reflection at the first polarizing beam splitter BS1. The respective beams go from the first polarizing beam splitter BS1 through cylindrical lenses CL1 and CL2 located before the mirrors M1 and M2 in an optical path, and are reflected at the mirrors M1 and M2, arriving at the second polarizing beam splitter BS2. Here, the s-polarized light component alone is reflected while the p-polarized light component passes through; both the beams travel in the Y-axis direction. Two such beams are expanded in beam diameter by positive lenses L3 and L4 confocal with each other, arriving at a mirror M3; however, a quarter-wave plate $\lambda/4$ interposed between the positive lenses L3 and L4 turns them into circularly polarized light. The laser light reflected by the mirror M3 in the X-axis direction enters a filter box 2 built in an inverted microscope. The two beams are reflected in the Z-axis direction by the first dichroic mirror DM1 located in the filter box 2 and has the property of transmitting visible light and reflecting light in the near infrared range. The two beams then enter an infinity correction oil immersion objective lens Ob mounted on the microscope where they are collected, entering a subject in a flow passage 5 through a microchannel MC via an oil immersion oil. Note here that there is a mercury lamp 3 located to illuminate the subject in the flow passage 5 through the microchannel MC; that is, illumination light from that mercury lamp 3 is reflected off the second dichroic mirror DM2 located on a viewing side with respect to the first dichroic mirror DM1, and enters the objective lens Ob through the first dichroic mirror DM1 where it is collected to illuminate the subject. A fluorescent image of the subject in the flow passage through the micro-channel MC, magnified by the objective lens Ob, is taken by a photographic camera 4 through the first and second dichroic mirrors DM1 and DM2. That image is displayed, and recorded.

The half-wave plate $\lambda/2$ here is adjustable in terms of rotation about the optical axis (X-axis) so that the direction of linearly polarized light oscillated from the laser 1 is adjustable. By that adjustment, it is possible to adjust the proportion of the p- and s-polarized light components incident on the first polarizing beam splitter BS1.

Why the two beams are turned by the quarter-wave plate λ/4 into circularly polarized light for incidence on the subject is to hold back the generation of unwanted interference fringes.

The positions of mirrors M1 and M2 are adjustable in the direction of propagation of the respective beams (the mirror M1 for the X-axis direction, and the mirror M2 for the Y-axis direction), and the angles of mirrors M1 and M2 are adjustable about the Z-axis and the direction of propagation of each beam (the mirror M1 about the X-axis and the mirror M2 about the Y-axis), respectively. Further, the position of mirror M3 is adjustable in the direction of propagation of the beam (the Y-axis direction), and the rotation of cylindrical lenses CL1 and CL2 about the X- and Y-axes, respectively, is adjustable as well.

Figure 2A:
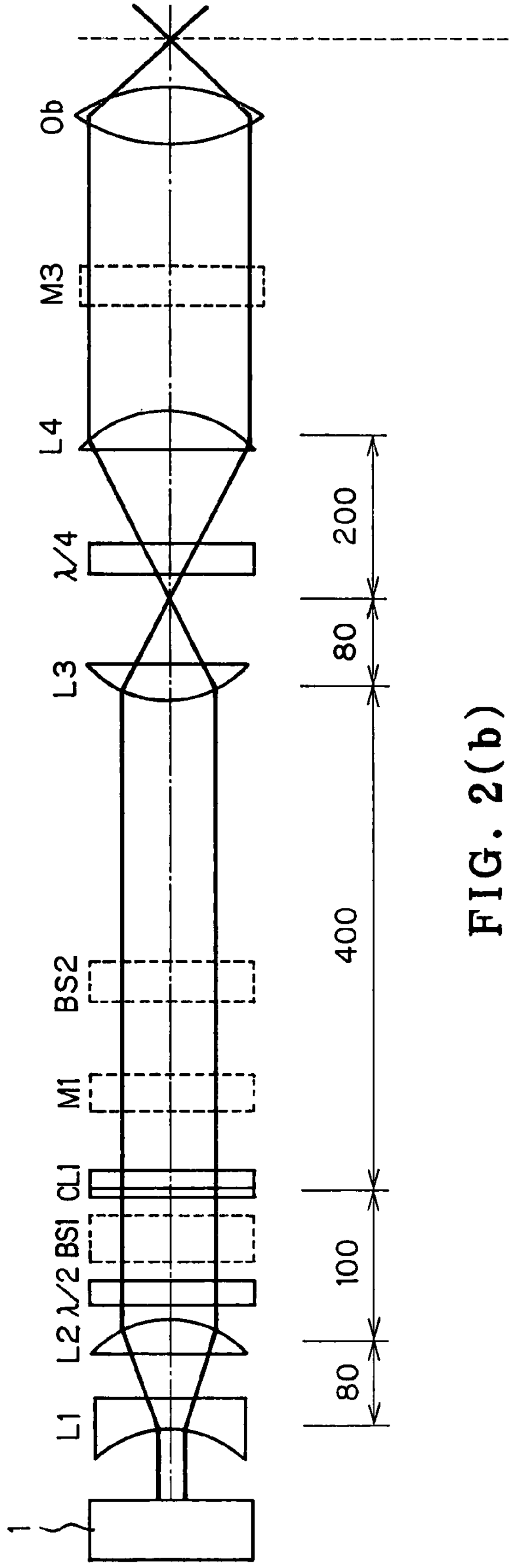
FIG. 2 is a taken-apart view of an optical path through the optical substance manipulator of FIG. 1.
Figure 2B:
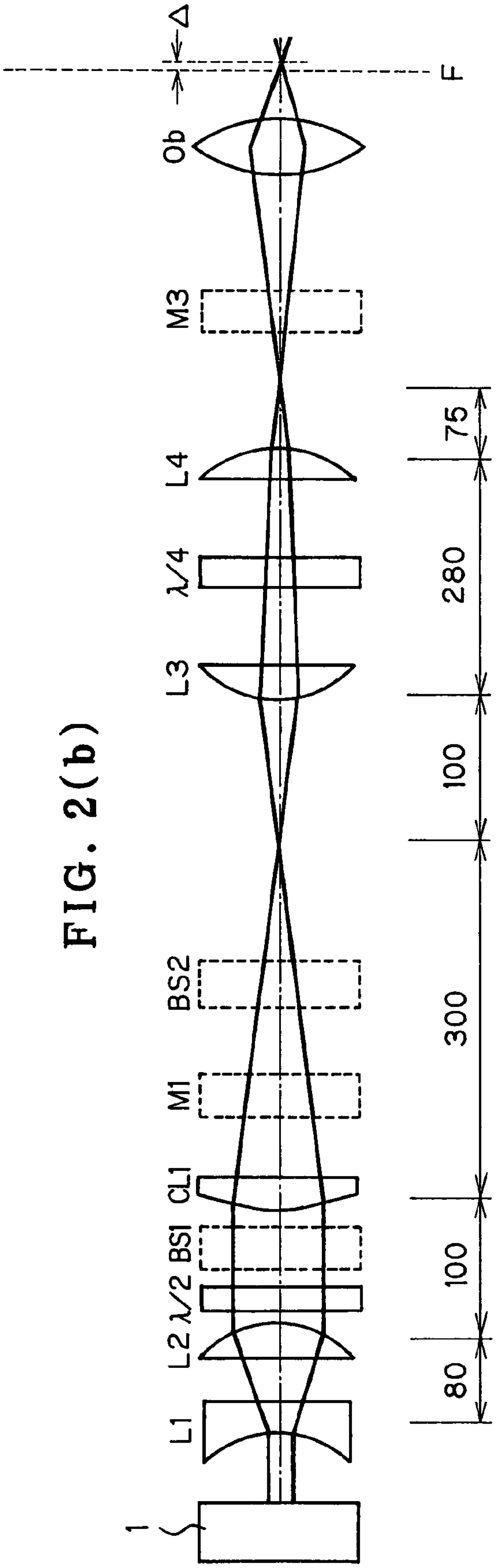

FIG. 2 is a taken-apart view of one optical path from the laser 1 of the optical substance manipulator of FIG. 1 via the first polarizing beam splitter BS1, the cylindrical lens CL1 and the second polarizing beam splitter BS2 as far as a focal plane F (subject surface) in the flow passage through the microchannel MC, and the same applies to another optical path through the cylindrical lens CL2, too. To be more specific, FIG. 2(*a*) is a taken-apart view of the optical path in a section along the generator of the cylindrical lens CL1, and FIG. 2(*b*) is a taken-apart view of the optical path in a section orthogonal to that generator. In FIGS. 2(*a*) and 2(*b*), the focal length of each lens and inter-lens distances are given in mm.

In the section of FIG. 2(*a*) where the refracting power of the cylindrical lens CL1 (CL2) does not work, parallel light oscillated from the laser 1 is expanded in beam diameter by the beam expander made up of the negative lens L1 and the positive lens L2. The parallel light with an expanded beam diameter goes through the half-wave plate λ/2, the first polarizing beam splitter BS1, the cylindrical lens CL1 (CL2), the mirror M1 (M2) and the second polarizing beam splitter BS2, and is expanded in beam diameter through the positive lenses L3 and L4 confocal with each other with the quarter-wave plate λ/4 interposed between them. The parallel light goes through the mirror M3 and enters as such the objective lens Ob, focusing on the focal plane F.

In the section of FIG. 2(*b*) where the refracting power of the cylindrical lens CL1 (CL2) works, on the other hand, a light beam through the cylindrical lens CL1 (CL2) turns under its positive refracting power into convergent light that converges in front of the positive lens L3. In the rear of the point of convergence, that convergent light turns into divergent light that is then incident on the positive lens L3. That divergent light again turns under the positive refracting powers of the positive lenses L3 and L4 into convergent light that converges in front of (on the viewing side) the objective lens Ob. In the rear of the point of convergence, the light, divergent this time, enters the objective lens Ob, and focuses at a minute distance Δ off the focal plane F under the positive refracting power of the objective lens Ob.

For this reason, the laser light is incident on the focal plane (subject surface) F: it is incident on a point in the section where the refracting power of the cylindrical lens CL1 does not work while it is incident on a certain width in the section where the refracting power of the cylindrical lens CL1 works, so that it can focus on the focal plane (subject surface) F in a linear or elliptic form. In other words, the laser light focuses on the focal plane (subject surface) F in two linear areas extending in the direction orthogonal to the generator of the cylindrical lens CL1, CL2.

And then, the position of each linear light-collective area is arbitrarily adjustable within the focal plane (subject surface) F by the adjustment of the position and angle of the mirror M1, M2 in the optical path, respectively. Further, the direction of that area is adjustable by the adjustment of the angle of each cylindrical lens CL1, CL2 about the optical axis.

In such an arrangement, a shutter was mounted on the s-polarized beam a optical path (running from the first polarizing beam splitter BS1 to the mirror M2 and the second polarizing beam splitter BS2 via the cylindrical lens CL2) while light made its way through only the p-polarized beam path (running from the first polarizing beam splitter BS1 to the mirror M1 and the second polarizing beam splitter BS2 via the cylindrical lens CL1). Then, the photographic camera 4 was used to pick up the behavior of microscopic particles dispersed in a fluid flowing in the flow passage 5 in the case where one linear light-collective area was positioned in the flow passage 5 through the microchannel MC. Consequently, such results as shown in FIG. 3 were obtained.

Figure 3A:
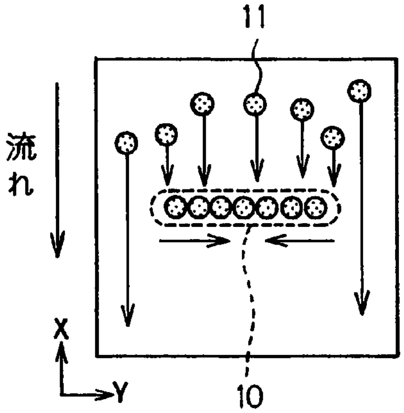
FIG. 3 is illustrative in schematic of the behavior of microscopic particles dispersed in a fluid that flows through a flow path in the case where light is collected at one linear light-collective area.
Figure 3B:
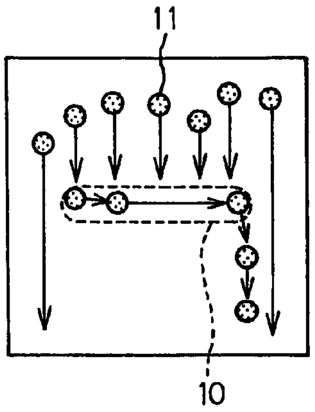
Figure 3C:
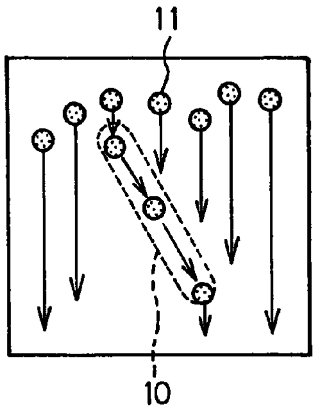
Figure 4A:
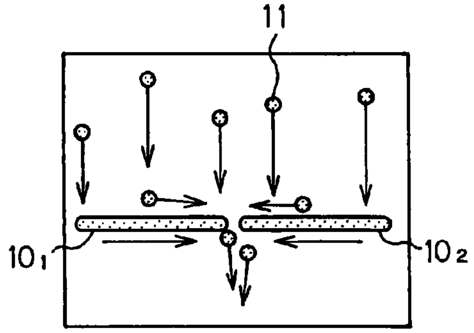
FIG. 4 is illustrative in schematic of the behavior of microscopic particles dispersed in a fluid that flows through a flow path in the case where light is collected by the optical substance manipulator of FIG. 1 at two linear light-collective areas.
Figure 4B:
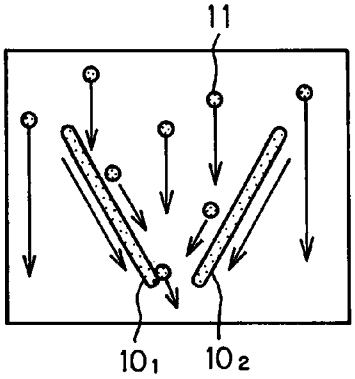
Figure 4C:
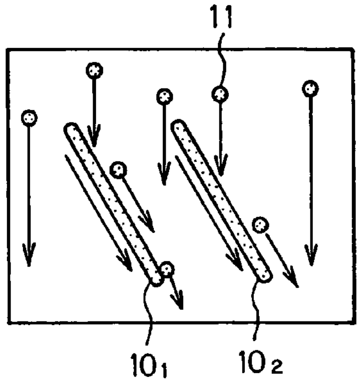
Figure 4D:
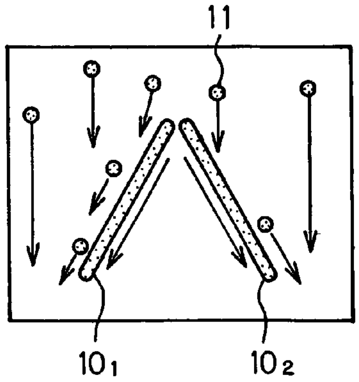

FIG. 3(*a*) is illustrative in schematic of how microscopie particles 11 dispersed in the fluid behaves in the case where the angle of the cylindrical lens CL1 is adjusted to form a linear light-collective area 10 with its direction lying in the Y-axis direction orthogonal to the direction (X-axis direction) of a flow in the flow passage 5. The laser light oscillated from the laser 1 is Gaussian distribution one with an intensity peak at the center: the linear light-collective area 10 has the highest intensity at the center. Accordingly, the microscopic particles 11 flowing at right angles with the linear light-collective area 10 under the radiation pressure of laser light go in the linear light-collective area 10, and once the microscopic particles 11 enter the linear light-collective area 10, they move from both its sides, gathering together in the central direction.

FIG. 3(*b*) is illustrative, as in FIG. 3(*a*), of the case where an almost half of the Gaussian distribution beam focusing on the focal plane F is blocked off halfway down in the optical path to bring the position of the linear light-collective area 10 having the highest intensity to near the right end of the drawing. In this case, the microscopic particles 11 flowing at right angles with the linear light-collective area 10 under the radiation pressure of laser light go into the linear light-collective area 10, and once the microscopic particles 11 enter the linear light-collective area 10, they move from the left to the right end of the drawing. The microscopic particles 11 gathering near that right end are saturated, leaving that right end in the flowing direction.

FIG. 3(*c*) is a schematic view illustrative of how microscopic particles 11 dispersed in the fluid behaves in the case where the angle of the cylindrical lens CL1 is adjusted to form a linear light-collective area 10 with its direction lying obliquely at an angle with the direction of a flow in the flow passage 5 (the X-axis direction). In this case, the microscopic particles 11 flowing at an angle with the linear light-collective area 10 under the radiation pressure of laser light go into the linear light-collective area 10, and once the microscopic particles 11 enter the linear light-collective area 10, they move a direction along the flow, or from the upper left to the lower right of the drawing when the linear light-collective area 10 tilts as shown. Then, the microscopic particles gathering together at that lower right end are saturated, leaving the lower right end in the direction of the flow.

Reference is then made to a modification to the inventive arrangement of FIG. 1 wherein light of almost equal intensity goes along both the p- and s-polarized beam paths: an account is given of how microscopic particles 11 dispersed in a fluid flowing in the flow passage 5 behaves where two linear light-collective areas $\mathbf{10}_1$ and $\mathbf{10}_2$ are located in the flow passage 5 through microchannel MC.

As shown in FIG. 4(*a*), the angles of cylindrical lenses CL1 and CL2 are adjusted with their refracting powers acting in the same direction to form two light-collective areas $10_1$ and $10_2$ at the same position in the direction of a flow within the flow passage 5 and with their directions lying orthogonal to that direction; as shown in FIG. 3(*b*), the left linear light-collective area $10_1$ is positioned such that there is the highest intensity at the right end, and the right linear light-collective area $10_2$ is positioned such that there is the highest intensity at the left end; and between the left $10_1$ and the right linear light-collective area $10_2$, there is a gap formed by the adjustment of the position and angle of the mirror M1 at the p-polarized light beam path and by the adjustment of the position and angle of the mirror M2 at the s-polarized light beam path. Then, the microscopic particles 11 flowing at right angles with the linear light-collective areas $10_1$ and $10_2$ under the radiation pressure of laser light go into the respective linear light-collective areas $10_1$ and $10_2$, and once they enter the linear light-collective areas $10_1$ and $10_2$, they move from the left to the right end of the area $10_1$ and from the right to the left end of the area $10_2$: they pass through the gap between the left $10_1$ and the right linear light-collective area $10_2$ as if focused or concentrated on that gap.

As shown in FIG. 4(*b*), the angles of cylindrical lenses CL1 and CL2 are separately adjusted such that at the same position in a direction of a flow within the flow passage 5, the left linear light-collective area $10_1$ lies in an obliquely lower right direction and the right linear light-collective area $10_2$ lies in an obliquely lower left direction, as shown in FIG. 3(*c*), and between the lower right end of the left $10_1$ and the lower left end of the right linear light-collective area $10_2$, there is a gap formed by the adjustment of the position and angle of mirrors M1 and M2 in the respective optical paths. Then, microscopic particles 11 flowing at angles with the linear light-collective areas $10_1$ and $10_2$ under the radiation pressure of laser light go into the respective linear light-collective areas $10_1$ and $10_2$, and once they enter the linear light-collective areas $10_1$ and $10_2$, they move from obliquely above to below in the drawing: they pass through the gap between the left $10_1$ and the right linear light-collective area $10_2$ as if focused or concentrated on that gap.

As shown in FIG. 4(*c*), the angles of cylindrical lenses CL1 and CL2 are adjusted with their refracting powers acting in the same direction such that the left and right light-collective areas $10_1$ and $10_2$ at the same position in the direction of a flow within a flow passage 5 are formed parallel at a spacing in an obliquely lower right direction. Then, microscopic particles 11 flowing at angles with the linear light-collective areas $10_1$ and $10_2$ under the radiation pressure of laser light go into the linear light-collective areas $10_1$ and $10_2$, and once they enter the linear light-collective areas $10_1$ and $10_2$, they move from obliquely above to below of the drawing. The microscopic particles 11 gathering together at the lower ends of the respective linear light-collective areas $10_1$ and $10_2$ are saturated, leaving the respective lower ends while separated into two.

As shown in FIG. 4(*d*), the angles of cylindrical lenses CL1 and CL2 are separately adjusted such that at the same position in the direction of a flow within a flow passage 5, the left linear light-collective area $10_1$ lies in an obliquely lower left direction and the right linear light-collective area $10_2$ lies in an obliquely lower right direction, as shown in FIG. 3(*c*), and the areas $10_1$ and $10_2$ are positioned by the adjustment of the positions and angles of mirrors M1 and M2 in the respective optical paths with the upper right end of the left $10_1$ in contact with the upper left end of the right linear light-collective area $10_2$. Then, microscopic particles 11 flowing at angles with the linear light-collective areas $10_1$ and $10_2$ under the radiation pressure of light laser go into the respective linear light-collective areas $10_1$ and $10_2$, and once they enter the linear light-collective areas $10_1$ and $10_2$, they move from obliquely above to below of the drawing, whereupon the microscopic particles 11 gathering together at the lower ends of the linear light-collective areas $10_1$ and $10_2$ are saturated, leaving the respective lower ends while separated into two.

As described above, by the adjustment of the angles and relative positions of two linear light-collective areas $10_1$ and $10_2$ formed within the flow passage 5 with respect to the direction of the flow, for instance, it is possible to pick up, collect, concentrate, separate, deflect, deliver, mix, and sort out suspending microscopic particles, cells, DNAs or the like flowing within the flow passage 5. Fast rotation of the cylindrical lenses CL1 and CL2 is capable of stirring, mixing or otherwise processing them, too. Of course, the provision of three or more linear light-collective areas 10 formed by simultaneous collection of light makes more complicated manipulations possible.

In the arrangement of the embodiment of FIG. 1, cylindrical mirrors may just as well be used in place of the cylindrical lenses CL1 and CL2; instead of the mirrors M1 and M2, other optical elements such as prisms may just as well be employed; and in lieu of the beam splitters BS1 and BS2, other light splitting means or optical combinations such as half-silvered mirrors may just as well be used.

While the optical substance manipulator of the invention has been described with reference to some embodiments, it is contemplated that the invention is in no sense limited to them, and so many modifications could be possible. For instance, it is understood that the number of linear light-collective areas to be formed within the flow passage is not always limited to two; three or more such areas may just as well be used.

What we claim is:

1. An optical substance manipulator capable of manipulating microscopic particles dispersed in a flowing fluid by means of light pressure, characterized by comprising an optical system that forms two linear light-collective areas simultaneously with respect to a fluid that flows on a subject surface, and further comprising, in optical paths forming the respective linear light-collective areas, means adapted to adjust directions of the linear light-collective areas on the subject surface, means adapted to adjust positions of the linear light-collective areas, said optical system comprises light splitter means adapted to split light coming out of one light source into two beams, each beam having a separate optical path, means adapted to independently adjust each beam for controlling the direction of each of the linear light-collective areas, means adapted to independently adjust each beam for controlling the position of each of the linear light-collective areas, light synthesis means adapted to synthesize the light split into two beams, and an object lens adapted to collect the synthesized light to form the two linear light-collective areas simultaneously on a subject surface, wherein each linear light-collective area is a light beam having a linear profile as viewed on the subject surface.

2. The optical substance manipulator according to claim 1, characterized in that said means adapted to adjust the directions of the linear light-collective areas is a cylindrical lens or mirror adjustable in terms of rotation about its optical axis.

3. The optical substance manipulator according to claim 2, characterized in that the means adapted to adjust the positions of the linear light-collective areas comprises an optical element adjustable in terms of position along the direction of propagation of the beam and angle.

* * * * *